(12) United States Patent
Spooner et al.

(10) Patent No.: US 11,095,593 B2
(45) Date of Patent: Aug. 17, 2021

(54) VERIFICATION SYSTEM FOR MESSAGE DELIVERY AND PROCESSING

(71) Applicant: BILLUPS, INC., Lake Oswego, OR (US)

(72) Inventors: Shawn Spooner, Beaverton, OR (US); Sicong Chen, Tigard, OR (US)

(73) Assignee: BILLUPS, INC., Lake Oswego, OR (US)

( * ) Notice: Subject to any disclaimer, the term of this patent is extended or adjusted under 35 U.S.C. 154(b) by 3 days.

(21) Appl. No.: 16/443,399

(22) Filed: Jun. 17, 2019

(65) Prior Publication Data

US 2020/0396192 A1    Dec. 17, 2020

(51) Int. Cl.
| | | |
|---|---|---|
| *H04L 12/58* | (2006.01) | |
| *G06F 16/29* | (2019.01) | |
| *H04W 40/20* | (2009.01) | |
| *H04W 40/38* | (2009.01) | |
| *H04W 4/14* | (2009.01) | |

(52) U.S. Cl.
CPC .............. *H04L 51/20* (2013.01); *G06F 16/29* (2019.01); *H04L 51/14* (2013.01); *H04W 4/14* (2013.01); *H04W 40/205* (2013.01); *H04W 40/38* (2013.01)

(58) Field of Classification Search
CPC .......... H04L 51/20; H04L 67/18; H04W 4/02; H04W 40/205; H04W 40/38; G06F 16/29
See application file for complete search history.

(56) References Cited

U.S. PATENT DOCUMENTS

| | | | |
|---|---|---|---|
| 6,465,963 B1 * | 10/2002 | Turnbull | B60C 23/061 307/10.8 |
| 7,512,492 B2 | 3/2009 | Irvin | |
| 7,813,743 B1 * | 10/2010 | Loeb | H04L 51/20 455/456.3 |
| 8,131,312 B2 | 3/2012 | Levin | |
| 8,798,613 B2 | 8/2014 | Macnaughtan | |
| 9,183,572 B2 | 11/2015 | Brubaker | |
| 9,824,387 B2 | 11/2017 | Haver | |
| 10,036,638 B2 | 7/2018 | D'alberto | |
| 10,271,229 B1 | 4/2019 | Mclaughlin | |
| 10,623,349 B2 * | 4/2020 | Gillespie | H04L 51/046 |
| 2007/0038516 A1 | 2/2007 | Apple | |
| 2008/0139181 A1 | 6/2008 | Lokshin | |

(Continued)

OTHER PUBLICATIONS

Barry Levine, "Martech-Firefly Adds Mobile Device-like Targeting to Ads on Car Rooftops" Retrieved at https://martechtoday.com/firefly-adds-mobile-device-like-targeting-to-ads-on-car-roottops-228459 Dated Dec. 3, 2018.

(Continued)

*Primary Examiner* — Mohamed A. Wasel
(74) *Attorney, Agent, or Firm* — Lempia Summerfield Katz LLC

(57) ABSTRACT

A verification system implements technical solutions for verifying the delivery of messages transmitted by mobile communication systems and the processing of those messages. The message verification system includes a model database and verification processing circuitry configured to receive transmitter route data, receive receiver route data, determine a viewshed for a message, and compare the viewshed to the receiver route data.

17 Claims, 5 Drawing Sheets

(56) References Cited

U.S. PATENT DOCUMENTS

| | | | |
|---|---|---|---|
| 2009/0150489 A1* | 6/2009 | Davis | H04W 4/023 |
| | | | 709/204 |
| 2009/0315766 A1 | 12/2009 | Khosravy | |
| 2010/0262449 A1 | 10/2010 | Monteforte | |
| 2013/0013412 A1 | 1/2013 | Altman | |
| 2015/0057035 A1* | 2/2015 | Somekh | H04L 67/26 |
| | | | 455/466 |
| 2017/0200197 A1 | 7/2017 | Brubaker | |
| 2017/0243249 A1 | 8/2017 | Flack | |
| 2018/0197203 A1 | 7/2018 | Wan | |

OTHER PUBLICATIONS

Fang, Zheng, et al. "Contemporaneous and delayed sales impact of location-based mobile promotions." Information Systems Research 26.3 (2015): 552-564.
Foursquare, "Pinpoint by Foursquare" Retrieved at https://enterprise.foursquare.com/products/pinpoint Accessed May 16, 2019.
International Search Report and the Written Opinion for International Patent Application PCT/US20136372 dated Aug. 28, 2020.

* cited by examiner

VERIFICATION SYSTEM FOR MESSAGE DELIVERY AND PROCESSING

TECHNICAL FIELD

This disclosure relates to communication systems. More particularly, this disclosure relates to verifying that messages have been delivered and processed.

BACKGROUND

Recent decades have brought tremendous advances in communication systems. These advances have enabled the global proliferation of smartphones and many other mobile communication systems. Smartphones have placed WiFi, cellular, Bluetooth, and NFC communication systems, as well as GPS capability, in the pocket of almost every individual, almost all of the time. Improvements in verifying the delivery of messages transmitted by mobile communication systems and the processing of those messages will further enhance the effectiveness of modern communication systems.

DETAILED DESCRIPTION

Important technical problems pose a challenge to verifying message delivery and processing when mobile entities are involved. As examples, the technical problems include determining whether a mobile receiver is in a position which allows receiving a message transmitted by a mobile entity. An additional technical problem is accounting for challenging environmental conditions. For instance, variations in lighting, topography, and obscuring objects all may impact whether a message can be received. It is also often difficult to determine whether or not the mobile receiver processed the message, even if it is known that the message was delivered to the mobile receiver. The verification system and techniques described below solve these and other technical problems.

Figure 1:
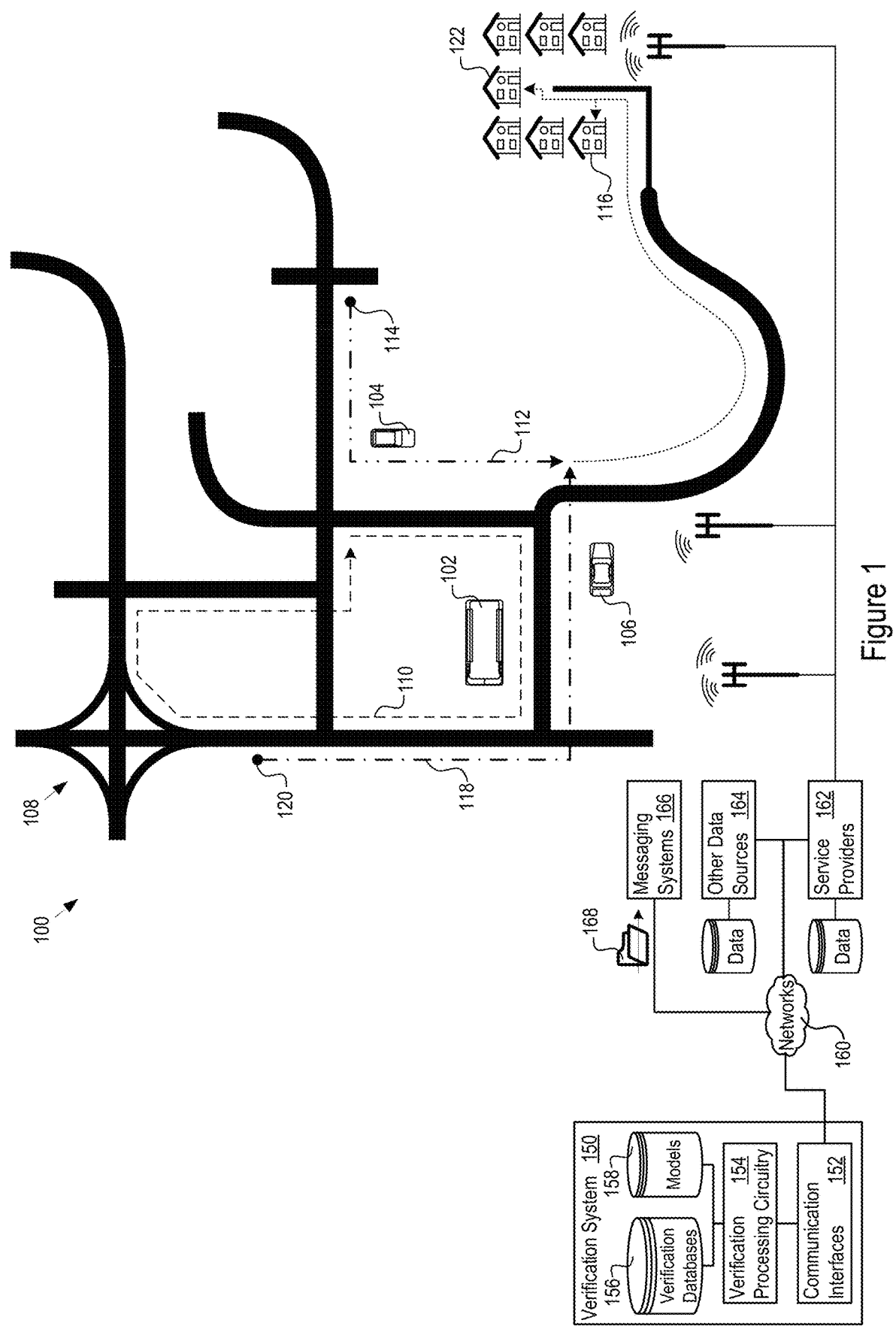
FIG. 1 shows a verification system operating in an environment in which mobile messaging transmission and mobile message receipt occurs.

FIG. 1 shows an example environment 100 in which a verification system 150 operates to verify message delivery and processing. In this particular example, the verification system 150 verifies message delivery and processing with respect to messages transmitted by the mobile transmitter 102 to mobile receivers, such as the mobile receivers 104 and 106. Several examples below are provided for discussion purposes, but note that the particular environment that the verification system 150 analyzes may vary extensively, as may the number and types of messages, mobile transmitters, and mobile receivers.

In the example of FIG. 1, the environment 100 includes the mobile transmitter 102 and the mobile receivers 104 and 106, which move along a road system 108. There may be any number of mobile transmitters and mobile receivers. In addition, the mobile transmitters and mobile receivers may take a wide variety of forms, as examples: buses, taxis, trains, boats, automobiles, cars, trucks, motorcycles, airplanes, human beings, animals, helicopters, hot air balloons, dirigibles, or other mobile entities.

The mobile transmitters and receivers move along arbitrary routes. In FIG. 1 for instance, the mobile transmitter 102 moves along a predefined repeating route 110, while the mobile receiver 104 moves along the route 112 from the starting point 114 to the destination point 116, and the mobile receiver moves along the route 118 from the starting point 120 to the destination point 122. The routes may be predefined paths that follow a known timing schedule defined by, as examples, a bus schedule or train schedule. Transmitter and receiver location and timing along the routes may be enhanced, corrected, or interpolated by systems that receive feedback on location, speed, and timing, e.g., via global positioning system (GPS) data, WiFi location data, cellular basestation data, manual location and reporting, or in other manners. For instance, interpolating the route of the mobile receiver 106 may add position and time sample points between the starting point 120 and the destination point 122 to ensure a sample resolution that meets a predefined sampling threshold, e.g., at least one sample per second or one sample per 100 feet.

In one implementation, the verification system 150 includes communication interfaces 152, verification processing circuitry 154, and verification databases 156. The verification databases 156 may include, as examples, map data, road data, image data (e.g., street view images), object data for objects in the environment, weather data, viewshed constructs, location and time data, route schedules, and other types of data. In some implementations, as described below, the verification system 150 may build and maintain models 158 that include physical models of mobile transmitters and mobile receivers, and probabilistic models used for determining likelihood of message delivery and processing.

The verification processing circuitry 154 connects through the communication interfaces 152 and networks 160 to any desired data sources to obtain data, or to supplement data that the verification system 150 already maintains. For instance, the verification processing circuitry 154 may receive location and time data defining the routes 110, 112, and 118 from mobile data service providers 162. As one example, the routes 112 and 118 may include location and timestamp information determined by cell towers serving the mobile entities 104 and 106 or location and timestamp information for individual cell phones carried within the mobile entities 104 and 106. As another example, the verification processing circuitry 154 may receive bus, train, and water taxi route location and time information from municipal scheduling data sources or other third party data sources 164. The verification system 150 may also receive mobile transmitter and mobile receiver characteristics from the data sources. Examples of mobile transmitter and mobile receiver characteristics include width, height, length, speed, acceleration, deceleration, roll, pitch, yaw, steering angle, and brightness of message displays (e.g., LCDs or illuminated signage) mounted on the mobile entities. The verification system 150 may include these characteristics (and others) in the models 158 of the mobile transmitters and mobile receivers.

The verification system 150 may also communicate with messaging systems 166. The messaging systems 166 may represent, for instance, systems or organizations which are responsible for providing the messages which the mobile entities transmit. The verification system 150 may communicate verification messages 168 to the messaging systems 166. The verification messages 168 may convey message transmission reports, message delivery statistics, message processing reports, and other message information reports to the messaging systems 166. As an example, the verification messages 168 may report whether any particular message was delivered and to which entities it was delivered, as well as whether the message was processed, including how and when it was processed.

As noted above, the verification system 150 verifies delivery of messages transmitted by the mobile transmitter 102 to the mobile receivers 104, 106. The verification system 150 also verifies whether the mobile receivers 104, 106 have processed the message. These two aspects of the operation of the verification system 150 are described in further detail below.

Figure 2:
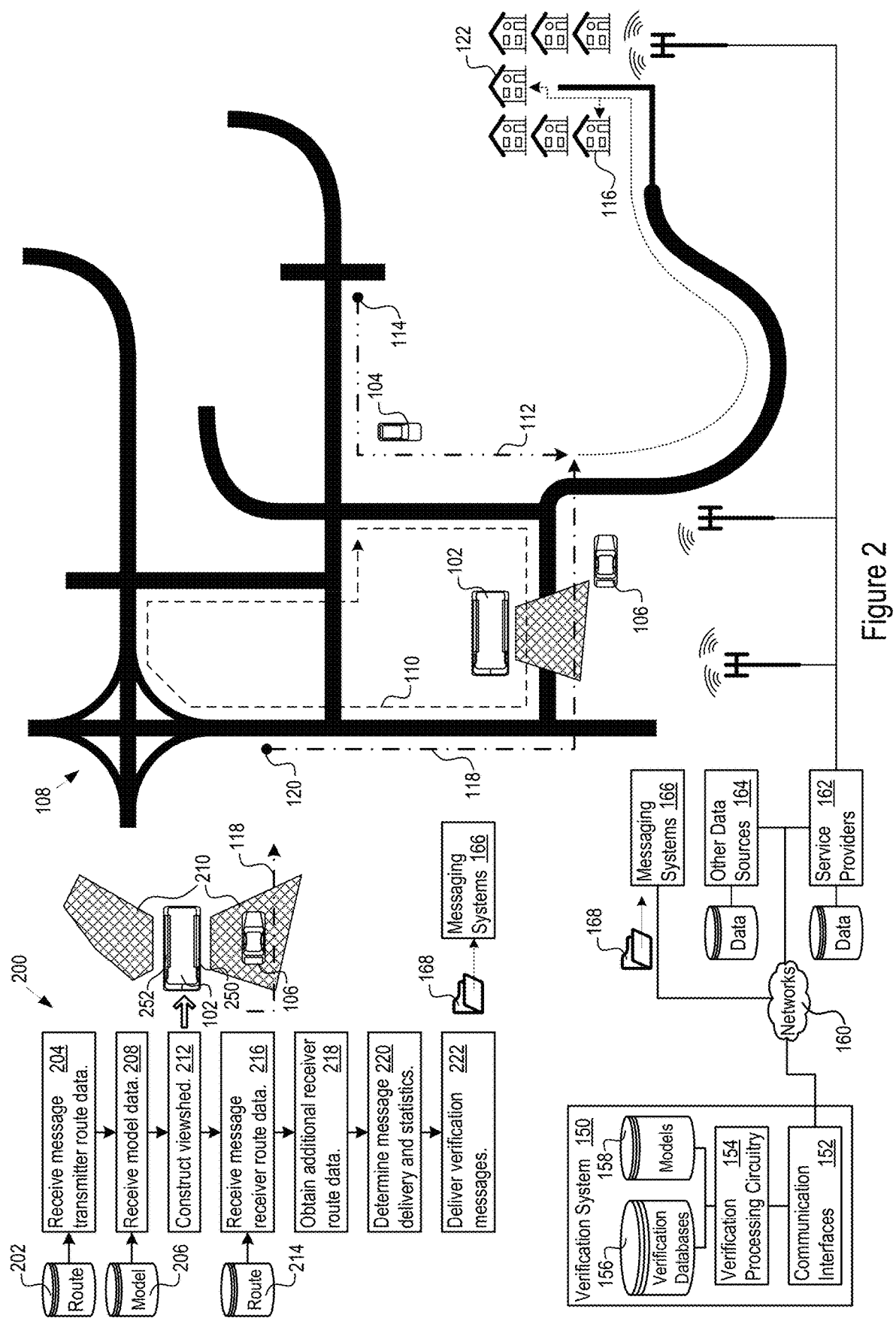
FIG. 2 shows an example of the operational logic of the verification system, including taking into consideration viewshed for determining when messages may be received.

FIG. 2 shows an example of the operational logic 200 of the verification system 150, including taking into consideration viewshed for determining whether messages were received. The verification system 150 receives transmitter route data 202 for the mobile transmitter 102 (204) and receives model data 206 for any selected mobile transmitters and receivers (208). This data may be obtained from the verification databases 156, external data sources, or both. The transmitter route data 202 may be provided at any desired resolution, e.g., location and timestamp samples at one-second intervals.

The verification system 150 constructs a viewshed 210 of the environment around the mobile transmitter 102 (212). The viewshed construction may take into consideration the model data 206. The viewshed 210 may, for instance, comprise one or more regions of physical locations around the mobile transmitter 102 which permit viewing of the message transmitted from the mobile transmitter 102. For instance, when the mobile transmitter carries a two-sided message transmitter, then the viewshed may be an hourglass shape emanating from the mobile transmitter. A fully-wrapped message transmitter may have a sphere-shaped viewshed, as another example. In the example of FIG. 2, the mobile transmitter 102 includes two LCD displays, 250 and 252, one on each side of the mobile transmitter 102. The viewshed 210 may include the position and the timestamp associated with the viewshed size and physical extent at that timestamp.

The size and extent of the viewshed 210 may vary over time according to the characteristics of the mobile transmitter as captured, for instance, in the model data 206. Example characteristics include size and shape of the mobile transmitter 102 and size, shape, brightness, and position of a message display mounted on the mobile transmitter 102. The verification system 150 may also determine the viewshed according to other factors such as acceleration, speed, and deceleration of the mobile transmitter 102, as well as direction of travel, weather (e.g., amount of daylight and meteorological conditions), and other inputs. In addition, artificial lighting characteristics may be included in the models 158 and may influence the viewshed. For example, the amount and intensity of external lights mounted on the mobile transmitter 102 (as well as artificial lights in the environment) may impact the spatial and temporal characteristics of the viewshed 210 for messages transmitted from the mobile transmitter 102.

The verification system 150 also receives receiver route data 214 for the mobile receivers (216). When the receiver route data 214 is incomplete or too sparse, then the verification system 150 may interpolate to obtain route data, or may request supplemental receiver route data from the external data sources (218). For instance, the verification system 150 may determine whether the route time and location sample interval is less than a pre-defined sampling threshold (such as one location sample per second or one location sample per 50 feet), and if so, obtain additional route data.

The verification system 150 compares the viewshed 210 with the receiver route data 214 to determine whether the message was delivered to any particular mobile receiver (220). In the example of FIG. 2, the verification system 150 determines that the message has been delivered to the mobile receiver 106 because the mobile receiver 106 is within the viewshed 210 at the time that the mobile transmitter 102 is transmitting its message. In some implementations, the verification system 150 may also apply a probabilistic viewing model to measure the likelihood that any selected mobile receiver has observed the transmitted message, e.g., an advertisement transmitted from the LCD screens 250, 252 on the side of the mobile transmitter 102.

With regard to the viewing model, the verification system 150 considers several factors, such as the trajectory and speed of the mobile receiver as it travels, the relative viewing angle to the mobile transmitter, as well as the time that the message was in clear view of the receiver. The viewing model may take the form of a Gaussian process model in which the probability that the message was delivered (e.g., received or viewed by an individual) is governed by the displacement from the center of the field of view of the receiver, the viewing distance to the mobile transmitter, and the relative viewing angle of the mobile receiver to the mobile transmitter. For verification of message delivery to individuals in particular, the viewing model may be fitted to human eye tracking studies over a variety of real-world environments and the process is iterated for each half second block of time (for example) that the mobile transmitter and mobile receiver are coincident. The output of this process is the full posterior distribution for the mobile receiver to have received the message.

The verification system 150 may also determine delivery statistics. The delivery statistics may include details such as a count of mobile receivers judged to have received the message or having been at least exposed to the message, a demographic breakdown of the mobile receivers, and other statistics. For instance, the demographic breakdown be based in part on characteristic data provided by the service providers 162. When the mobile receivers are individual viewers, the demographic data may include features such as age, education, gender, occupation, income, marital status, and the like. The verification system 150 transmits the verification messages 168 including the message delivery determinations and delivery statistics to the messaging systems 166 (222) for reporting purposes.

Figure 3:
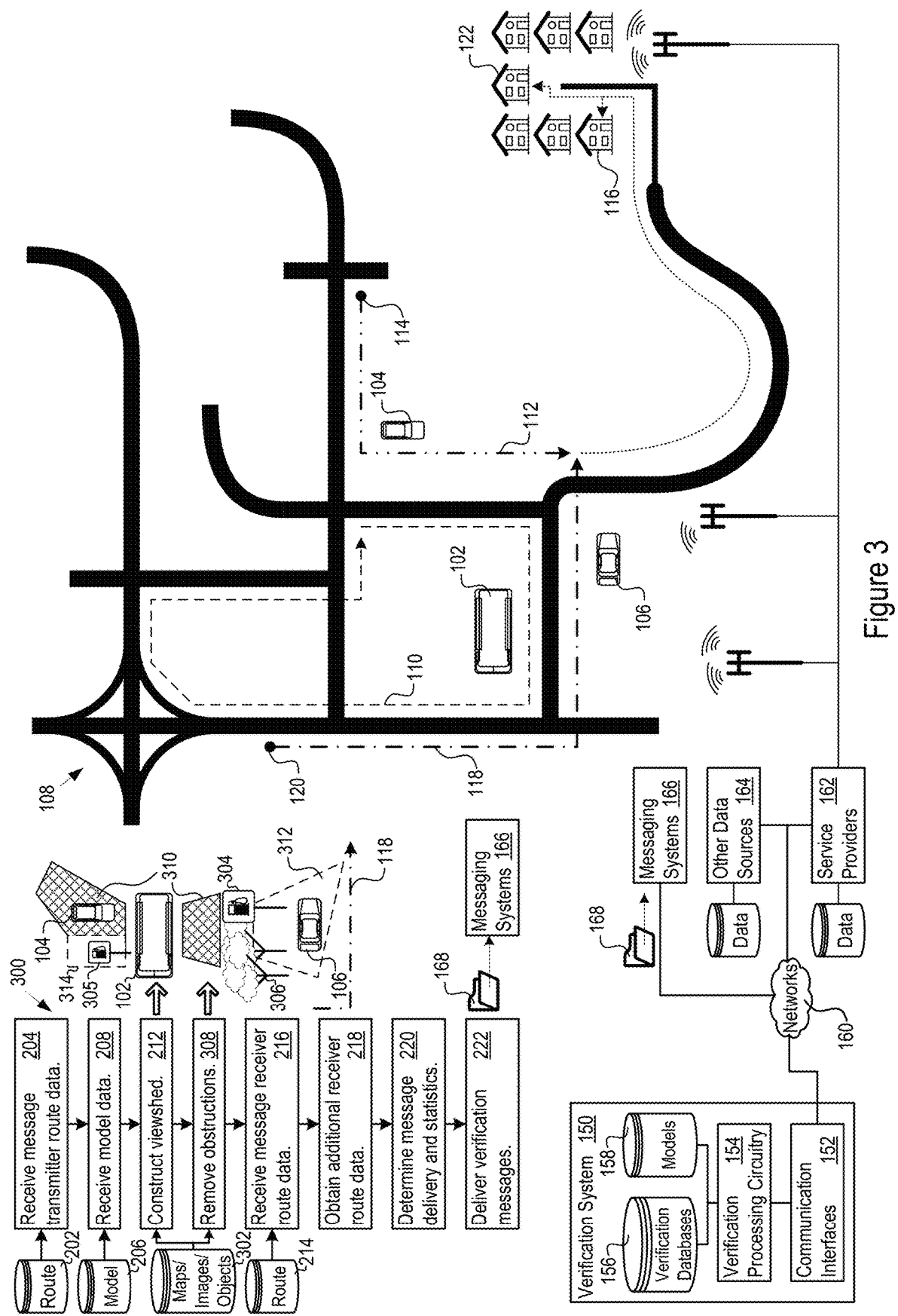
FIG. 3 shows another example of the operational logic of the verification system, including taking into consideration obstructions in the viewshed.

FIG. 3 shows another example of operational logic 300 of the verification system 150, including taking into consideration obstructions in the viewshed. In particular, the verification system 150 may receive object data 302 for the environment in and around the mobile transmitter. The object data 302 may include, as examples, map and image data (e.g., street view images) that captures obscuring objects, or explicit records of size, location, and facing of: signage, bulletin boards, trees, hedges, fences, hills, telephone poles, and other potentially obstructing objects near the mobile transmitter that affect the viewshed 210.

FIG. 3 shows several obstructing objects in the environment: the signage 304 and 305, and the tree line 306. The verification system 150 determines when obstructions in the environment occlude the view from the mobile receiver to the mobile transmitter 102. Those obstructions are removed from the viewshed (308). In other words, the viewshed no longer includes the areas in which the objects occlude the view of the message.

As shown in FIG. 3, in this example, the verification system 150 determines that the mobile receiver 106 cannot receive the message. The viewshed 310 has been reduced by the occluded section 312 and is effectively much smaller in the direction of the mobile receiver 106 due to the obstructions. As a result, the mobile receiver 106 is no longer in the viewshed for the message. On the other hand, the verification system 150 determines that the mobile receiver 104 only has a partially obstructed viewpoint due to the signage 305, and can receive the message. In this example, the signage 305 reduces the viewshed by the occluded section 314, which leaves enough viewshed 310 for the mobile receiver 104 to receive the message.

Figure 4:
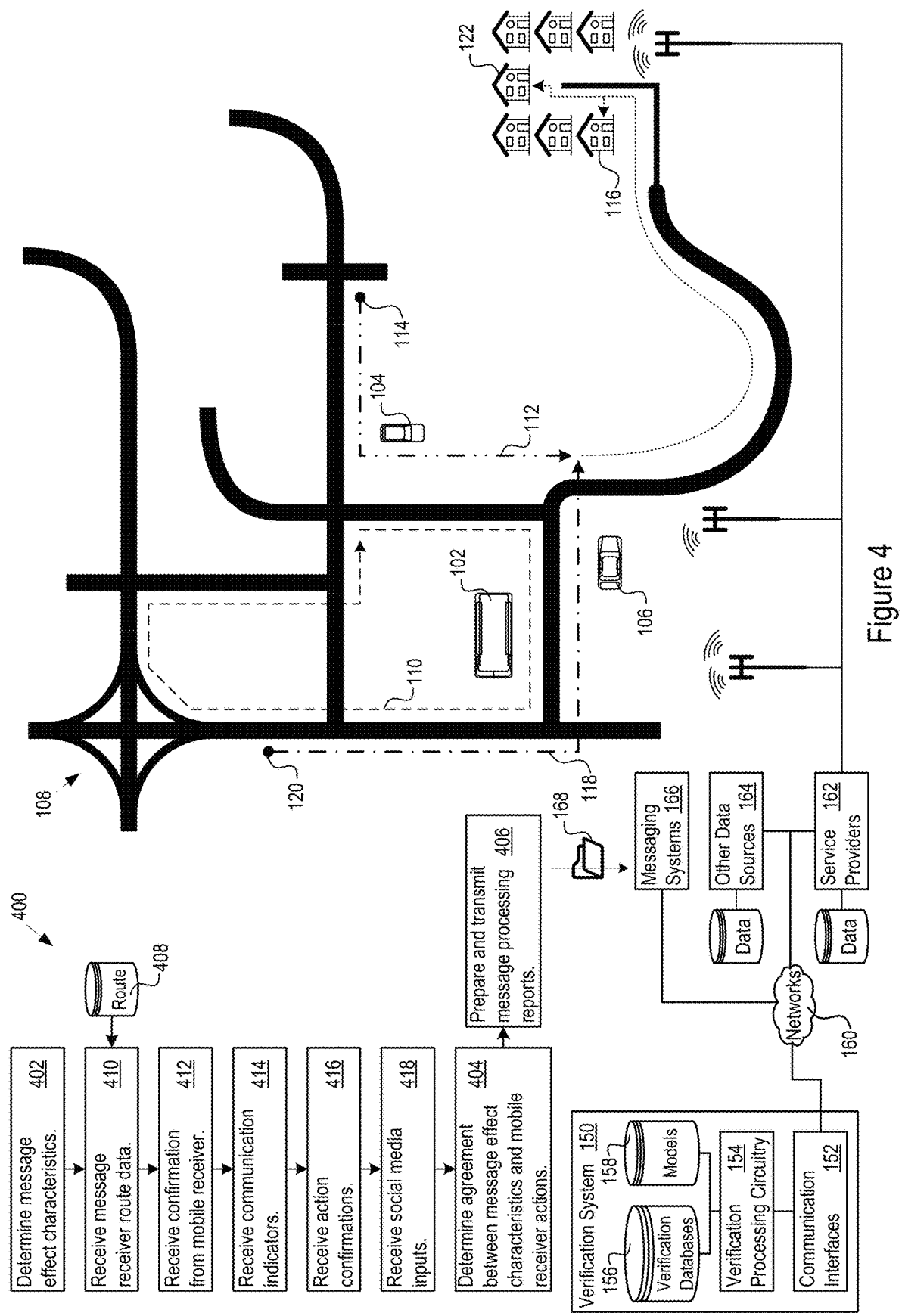
FIG. 4 shows another example of the operational logic of the verification system, including determining message processing.

FIG. 4 shows another example of the operational logic 400 of the verification system, including determining message processing. The verification system 150 may implement a wide variety of approaches to determining whether a mobile receiver has processed the message it has received. In one implementation, the verification system 150 obtains or determines expected message effect characteristics (402), e.g., by retrieving them from the verification database 156, by obtaining them from the external data sources, or both. These characteristics may indicate as examples, assuming the message receiver processed the message, how the message receiver would be expected to move, actions that the message receiver would be expected to take, communications the message receiver would be expected to send or receive, or other indicia of message processing. The verification system 150 may determine message processing according to whether or not there is agreement between the effect characteristics and actions taken by the mobile receiver (404). In addition, the verification system 150 may prepare and transmit message processing reports (406) to the messaging systems 166.

When the message effect characteristics are route characteristics, then the verification system 150 may receive subsequent route data 408 for the mobile receiver 106 for a predefined period of time, e.g., for up to one week after receipt of the message (410). The verification system 150 may then determine whether the subsequent route data 408 evidences agreement between the mobile receiver and the effect characteristics (404). As a specific example, assume that the message concerns free admission to the Kennedy Space Center for the Apollo 11 50th Anniversary program. The expected message effect characteristics may then include travel of the mobile receiver 106 to or within a predefined region (e.g., to Merritt Island, Fla.) one of the days of free admission. The agreement of the mobile receiver route and the expected message effect characteristics, combined with the verification that the message was received indicate that the message was actually processed and acted upon by the mobile receiver 106.

As another example, the verification system 150 may receive an explicit confirmation of message processing from the mobile receiver 106 (412). For instance, the mobile receiver 106 may transmit a confirmation message to the verification system 150, service providers 162, or other system the mobile receiver 106 has claimed free-admission passes to the Kennedy Space Center in response to the message it received. Confirmation messages received by systems other than the verification system 150 may be transmitted to the verification system 150 for processing.

Another technique for determining message processing is for the verification system to receive communication indicators (414) that evidence message processing. As examples, the verification system 150 may receive confirmation (e.g., from the mobile device 106, service providers 162, or other data sources 164) that the mobile device 106 accessed a web page or IP address for Kennedy Space Center after receiving the message. As another example, the verification system 150 may receive confirmation that the mobile receiver 106 placed a phone call to a phone number associated with Kennedy Space Center after receiving the message.

In some cases, the verification system 150 may receive action confirmations (416) that indicate message processing. For instance, the verification system 150 may receive a confirmation that the mobile device 106 redeemed a code (or took some other action required) for free admission, after the mobile device 106 received the message. Yet another source of message processing insight includes social media inputs received by the verification processing system 150 (418). For instance, the verification processing system 150 may monitor public social media platform posts to determine that the mobile receiver 106 acted on the message it received. As examples, the verification processing system 150 may detect photos of the Saturn V launch vehicle posted by the mobile receiver 106 to social media, or may detect newly posted messages including content tags relating to Kennedy Space Center after the mobile receiver 106 received the message.

Figure 5:
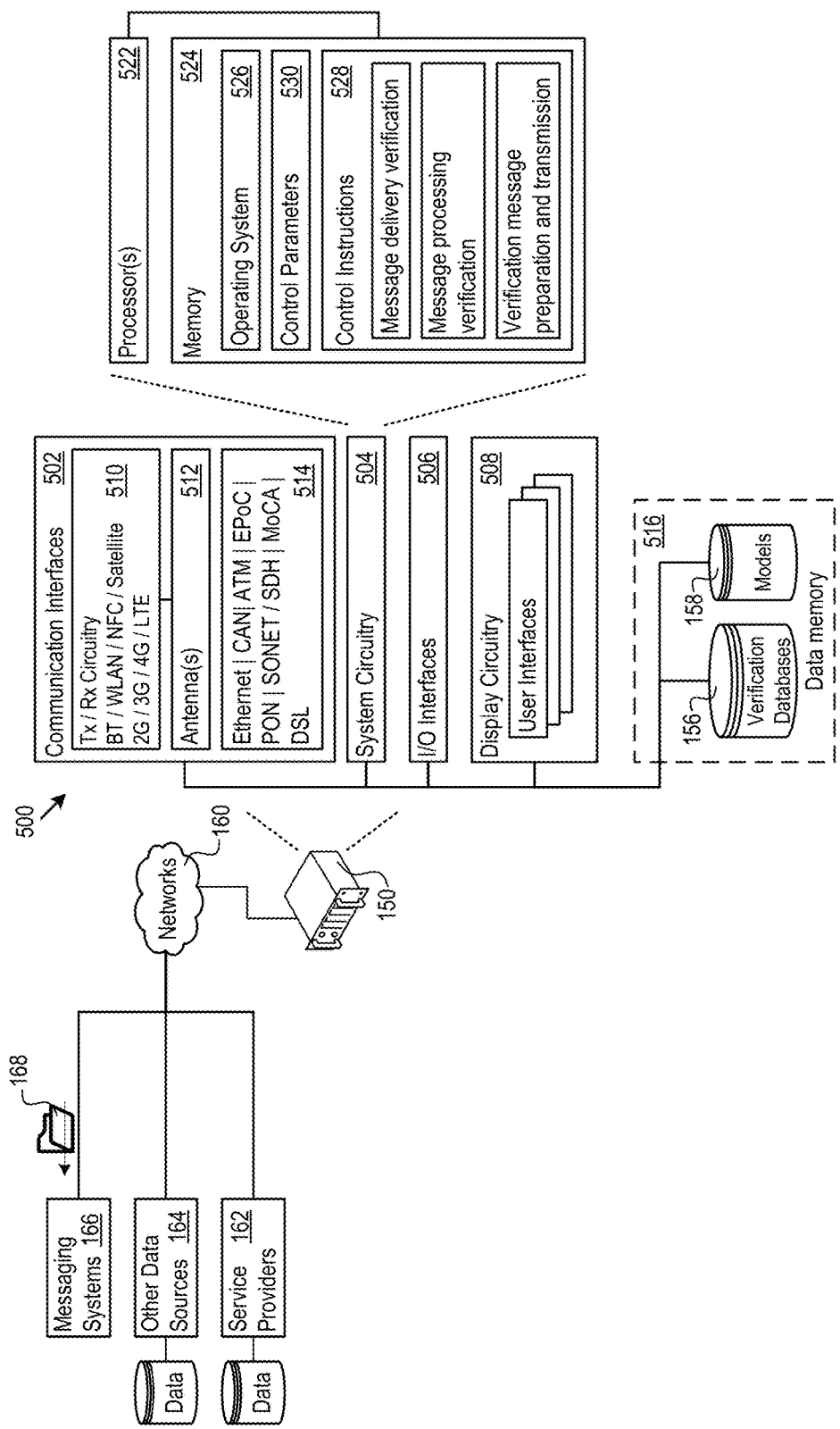
FIG. 5 shows an example implementation of the verification system.

FIG. 5 shows an example implementation 500 of the verification system 150. The implementation 500 includes communication interfaces 502, system circuitry 504, input/output (I/O) interfaces 506, and display circuitry 508. The system circuitry 504 may include any combination of hardware, software, firmware, or other circuitry. The system circuitry 504 may be implemented, for example, with one or more systems on a chip (SoC), application specific integrated circuits (ASIC), microprocessors, microcontrollers, discrete analog and digital circuits, and other circuitry. The system circuitry 504 is part of the implementation of any desired functionality in the verification system 150. Accordingly, the system circuitry 504 may implement the operational logic 200, 300, 400 described above in FIGS. 2-4, as examples. The verification system 150 may store and retrieve data from data memories 516. For instance, the data memories 516 may store the verification databases 156 and the models 158.

The display circuitry 508 and the I/O interfaces 506 may include a graphical user interface, touch sensitive display, voice or facial recognition inputs, buttons, switches, speakers and other user interface elements. Additional examples of the I/O interfaces 506 include Industrial Ethernet, Controller Area Network (CAN) bus interfaces, Universal Serial Bus (USB), Serial Advanced Technology Attachment (SATA), and Peripheral Component Interconnect express (PCIe) interfaces and connectors, memory card slots, and other types of inputs. The I/O interfaces 906 may further include Universal Serial Bus (USB) interfaces, audio outputs, magnetic or optical media interfaces (e.g., a CDROM or DVD drive), network (e.g., Ethernet or cable (e.g., DOCSIS) interfaces), or other types of serial, parallel, or network data interfaces.

The communication interfaces 502 may include transceivers for wired or wireless communication. The transceivers may include modulation/demodulation circuitry, digital to analog converters (DACs), shaping tables, analog to digital converters (ADCs), filters, waveform shapers, filters, pre-amplifiers, power amplifiers and/or other circuitry for transmitting and receiving through a physical (e.g., wireline) medium such as coaxial cable, Ethernet cable, or a telephone line, or through one or more antennas. Accordingly, Radio Frequency (RF) transmit (Tx) and receive (Rx) circuitry 510 handles transmission and reception of signals through one or more antennas 512, e.g., to support Bluetooth (BT), Wireless LAN (WLAN), Near Field Communications (NFC), and 2G, 3G, and 4G/Long Term Evolution (LTE) communications.

Similarly, the non-wireless transceivers 514 may include electrical and optical networking transceivers. Examples of electrical networking transceivers include Profinet, Ethercat, OPC-UA, TSN, HART, and WirelessHART transceivers, although the transceivers may take other forms, such as coaxial cable network transceivers, e.g., a DOCSIS compliant transceiver, Ethernet, and Asynchronous Transfer Mode (ATM) transceivers. Examples of optical networking transceivers include Synchronous Optical Networking (SONET) and Synchronous Digital Hierarchy (SDH) transceivers, Passive Optical Network (PON) and Ethernet Passive Optical Network (EPON) transceivers, and EPON Protocol over Coax (EPoC) transceivers.

Note that the system circuitry 504 may include one or more controllers 522, e.g., microprocessors, microcontrollers, FGPAs, GPUs, and memories 524. The memory 524 stores, for example, an operating system 526 and control instructions 528 that the controller 522 executes to carry out desired functionality for the verification system 150. Accordingly, the control instructions 528 may implement the logic 200, 300, 400 described above and with regard to FIGS. 2-4 for message delivery verification, message processing verification, and verification message preparation and delivery. The control parameters 530 provide and specify configuration and operating options for the control instructions 528.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A message verification system comprising:
   a model database configured to store a mobile transmitter physical model; and
   verification processing circuitry configured to:
      receive transmitter route data for a mobile transmitter;
      receive receiver route data for a mobile receiver;
      determine a viewshed for a message transmitted by the mobile transmitter as modeled by the mobile transmitter physical model;
      compare the viewshed to the receiver route data to determine whether the message was delivered to the mobile receiver;
      receive object data on a potentially obscuring object near the mobile transmitter; and
      determine whether to adjust the viewshed responsive to the object data.

2. The message verification system of claim 1, where:
   the verification processing circuitry is configured to determine that the message was delivered to the mobile receiver when the receiver route data indicates that the mobile receiver was in the viewshed when the message was transmitted.

3. The message verification system of claim 1, where:
   the verification processing circuitry is further configured to apply a probabilistic viewing model to determine whether the message was delivered to the mobile receiver.

4. The message verification system of claim 1, where:
   the verification processing circuitry is further configured to:
      reduce the viewshed by removing the potentially obscuring object when the potentially obscuring object occludes a view of the mobile transmitter from the mobile receiver.

5. The message verification system of claim 1, where:
   the verification processing circuitry is further configured to:

determine whether the mobile receiver has processed the message after the message was delivered to the mobile receiver.

6. The message verification system of claim 5, where:
the verification processing circuitry is further configured to:
receive expected message effect characteristics;
receive mobile receiver behavior subsequent to the delivery of the message to the mobile receiver; and
determine that the mobile receiver has processed the message when the mobile receiver behavior agrees with at least one expected message effect characteristic.

7. The message verification system of claim 1, where:
the verification processing circuitry is further configured to:
determine that the receiver route data is too sparse, and in response, interpolate the receiver route data to obtain additional receiver route data.

8. The message verification system of claim 1, where:
the message verification system further comprises a communication interface configured to communicate with external data sources; and
the verification processing circuitry is further configured to:
determine that the receiver route data is too sparse, and in response, request supplemental receiver route data from an external data source through the communication interface.

9. A method for message verification comprising:
storing, in a model database, a mobile transmitter physical model; and
with verification processing circuitry:
receiving transmitter route data for a mobile transmitter;
receiving receiver route data for a mobile receiver;
determining a viewshed for a message transmitted by the mobile transmitter as modeled by the mobile transmitter physical model;
comparing the viewshed to the receiver route data to determine whether the message was delivered to the mobile receivers;
receiving expected message effect characteristics;
receiving mobile receiver behavior subsequent to the delivery of the message to the mobile receiver; and
determining that the mobile receiver has processed the message after the message was delivered to the mobile receiver when the mobile receiver behavior agrees with at least one expected message effect characteristic.

10. The method of claim 9, further comprising:
determining that the message was delivered to the mobile receiver when the receiver route data indicates that the mobile receiver was in the viewshed when the message was transmitted.

11. The method of claim 9, further comprising:
applying a probabilistic viewing model to determine whether the message was delivered to the mobile receiver.

12. The method of claim 9, further comprising:
receiving object data on a potentially obscuring object near the mobile transmitter;
determining whether to adjust the viewshed responsive to the object data.

13. The method of claim 12, further comprising:
reducing the viewshed by removing the potentially obscuring object when the potentially obscuring object occludes a view of the mobile transmitter from the mobile receiver.

14. The method of claim 9, further comprising:
determining that the receiver route data is too sparse, and in response, interpolate the receiver route data to obtain additional receiver route data.

15. The method of claim 9, further comprising:
determining that the receiver route data is too sparse, and in response, request supplemental receiver route data from an external data source through a communication interface.

16. A message verification system comprising:
a model database configured to store a mobile transmitter physical model; and
verification processing circuitry configured to:
receive transmitter route data for a mobile transmitter;
receive receiver route data for a mobile receiver;
receive object data for objects in the environment around the mobile transmitter;
determine a viewshed for a message transmitted by the mobile transmitter responsive to the mobile transmitter physical model;
adjust the viewshed to account for those objects which occlude view of the mobile transmitter from the mobile receiver; and
apply a probabilistic viewing model to the viewshed and the receiver route data to determine whether the message was delivered to the mobile receiver.

17. The message verification system of claim 16, where:
the verification processing circuitry is further configured to:
receive expected message effect characteristics;
receive mobile receiver behavior subsequent to the delivery of the message to the mobile receiver; and
determine that the mobile receiver has processed the message when the mobile receiver behavior agrees with at least one expected message effect characteristic.

* * * * *